May 11, 1965
C. DOOMERNIK
3,183,014
PNEUMATIC SUSPENSION SYSTEM
Filed April 23, 1962
2 Sheets-Sheet 1
Fig. 1.
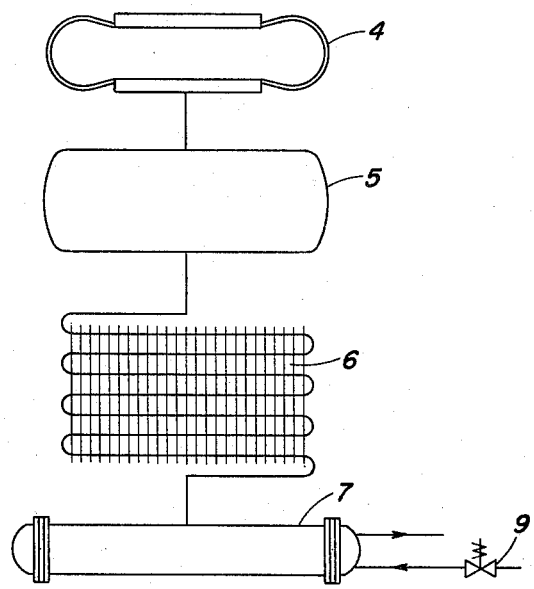
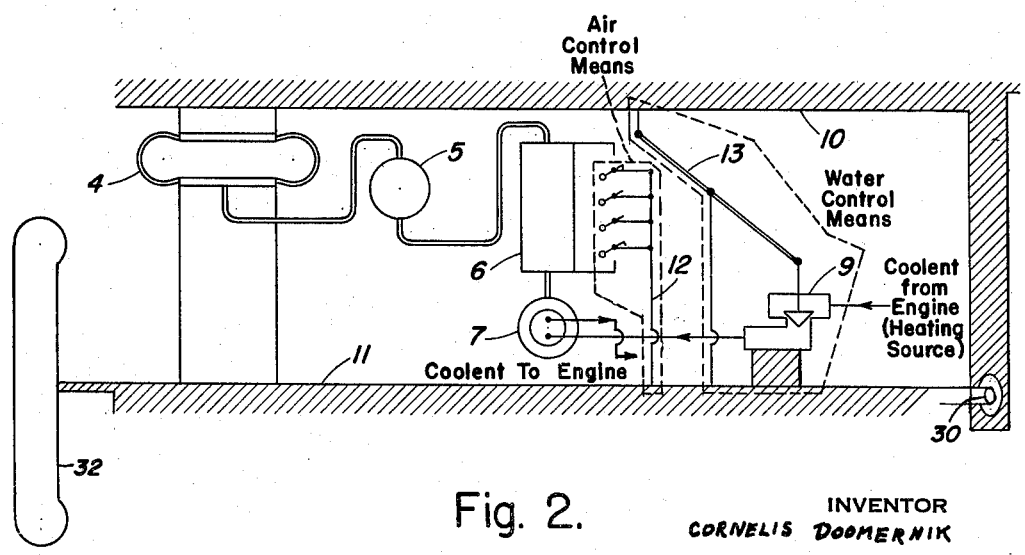
Fig. 2.
INVENTOR
CORNELIS DOOMERNIK
BY
ATTORNEY May 11, 1965

C. DOOMERNIK 3,183,014

PNEUMATIC SUSPENSION SYSTEM

Filed April 23, 1962

INVENTOR
CORNELIS DOOMERNIK
BY
ATTORNEY 3,183,014
PNEUMATIC SUSPENSION SYSTEM
Cornelis Doomernik, Dusseldorf, Germany, assignor to American Radiator & Standard Sanitary Corporation, New York, N.Y., a corporation of Delaware
Filed Apr. 23, 1962, Ser. No. 189,505
6 Claims. (Cl. 280—6)

The invention refers to a process for the production of a variable pressure, particularly in gas suspension bellows of vehicles.

It is known to use several gas suspension bellows being for instance in connection with a compressed air unit instead of a spring suspension by means of steel springs between chassis and vehicle body to reach a better ride. Such devices are very much subject to fouling by oil and to failures and they are expensive due to the numerous moving parts.

It is the object of the invention to eliminate these deficiencies in a simple way.

This aim is essentially reached in such a way that an evaporator supplied with a liquid agent is heated; this evaporator is in open connection with one or several gas suspension bellows through a condenser having a lower or higher capacity than the fully supplied evaporator whereby either only the heating source of the fully supplied evaporator having a higher capacity than the condenser is entirely or partly blocked or opened as soon as a pressure decrease or increase is required or only the capacity of the condenser having a higher capacity than the fully supplied evaporator is decreased or increased or by changing simultaneously the evaporator as well as condenser capacity corresponding to the required pressure necessities for the pressure decrease and increase. Besides a valve for the heating source of the evaporator which could eventually also be eliminated in case of a condenser with a higher capacity than the fully supplied evaporator, no moving parts are necessary for the gas suspension system according to the invention. Preferably the motor cooling water of the vehicle is used for the heating of the evaporator. The cooling of the condenser can be performed by the air stream or by ventilation. This task could also be taken over by the fan the water cooler. This is possible since the over-all coefficient of heat transfer and thus the capacity of the condenser are influenced by louvers, a flap, a movable partition or such as soon as a pressure increase or decrease is required. This can also be performed by using more or less condenser cooling surface which is reached by flooding the condenser with more or less condensate.

It is considered to be a favorable way that the condensers are installed in front of the water cooler of the vehicle. The water cooler is subdivided corresponding to the number of the condensers or gas suspension bellows and evaporators. As soon as a pressure increase is required, one or several condensers as well as the corresponding part of the water cooler are blocked on the air side and the water valve in the cooling water supply line of the evaporator is opened in case of a condenser with a lower capacity than the fully supplied evaporator. The evaporator is dimensioned in such a way that it can take over the capacity of the corresponding part of the cooler thus maintaining the balance of the heat economy of the vehicle. The blocking or opening on the air side of the condensers as well as the activating of the water valves to the evaporators can be performed by any desired means.

Other objects and features of the invention will appear as the description of the particular embodiment selected to illustrate the invention progresses. In the accompanying drawings, which form a part of this specification, like characters of reference have been applied to corresponding parts throughout the several views which make up the drawings.

FIGURE 1 shows a schematic view of a gas suspension bellows with parts necessary for the pressure control.

FIGURE 2 shows a schematic view of the parts necessary for the pressure control including mechanically activated louvers and water valve for a single wheel member of a vehicle.

Figure 3:
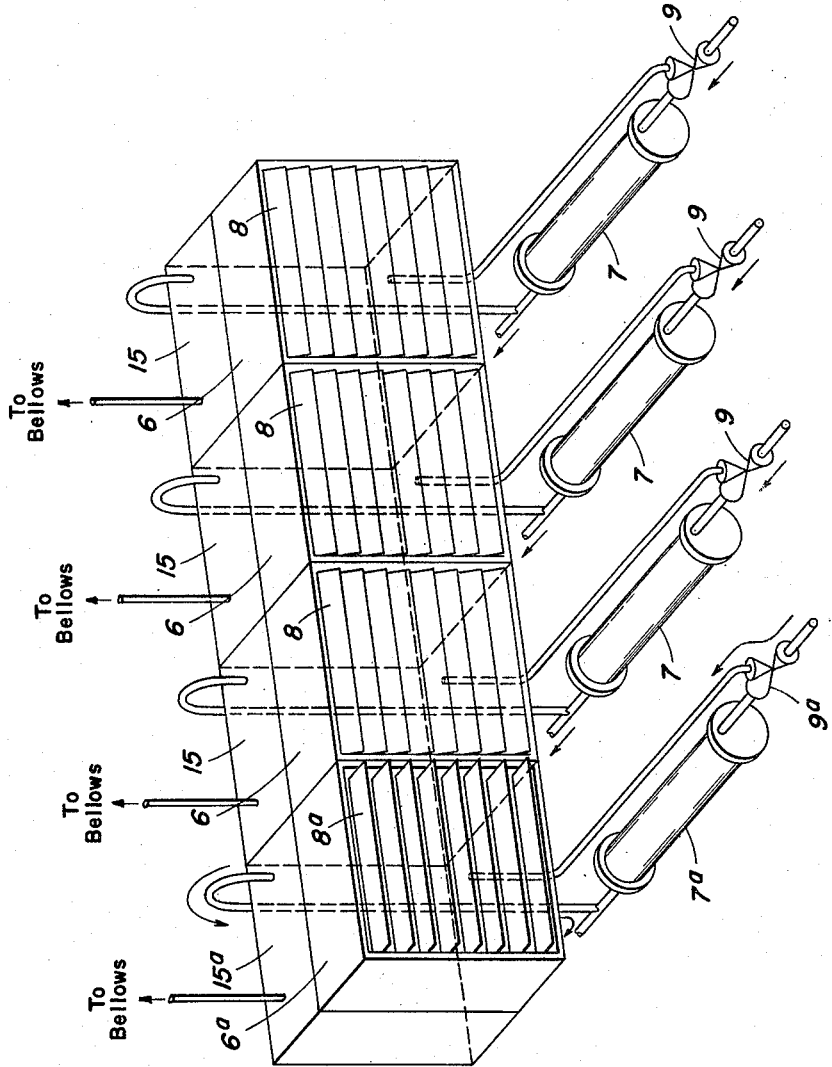
FIGURE 3 shows an example how the condensers and evaporators can be arranged towards the water cooler.

A gas suspension bellows 4 being in open connection with the evaporator 7 through an expansion tank 5 and air-cooled condenser 6. The capacity of the condenser 6 is lower than that of the evaporator supplied and heated with a refrigerant. An example regarding the design and arrangement of the louvers 8 and a valve 9 can be noted from FIGURES 2 and 3.

With reference to FIG. 2, there is illustrated structure embodying the principles of this invention associated with a single wheel of a vehicle. Naturally, a four wheel vehicle would require four such structures—one for each wheel. In practice, the vehicle body 10 can be pivotly connected to the frame or chassis 11 which supports a wheel 32. The application of weight to the vehicle body 10 urges the body 10 to move downward towards the wheel 32.

When the vehicle body 10 (FIGURE 2) is lowered, the louvers by the pivoting of the body 10 in a counter clockwise direction about the pivot point 30, are closed by the chassis 11 through the control rods 12, and the valve 9 connected with a control cable or rod 13 being held by the vehicle body opens the cooling water supply line. The vapor arising in the evaporator 7 is partly condensed in the condenser 6 whilst the remaining part of the vapor performs the pressure increase. As soon as the load changes, i.e., as soon as the vehicle body 10 is lifted, the valve 9 closes the cooling water supply line and the louvers 8 are opened. The condenser reaches its full efficiency causing the agent which starts to condense to fall into the evaporator by cooling it so that the pressure is by and by decreased. As will be noted, the difference in height between the vehicle body and chassis decisive for the suspension is used as direct control for the activation of the louvers as well as the valve.

The motor cooler (FIGURE 3) consists for instance of 4 parts 15, 15a each belonging to a gas suspension bellows with its pressure control system. Thus the necessary separate pressure regulation of the gas suspension bellows subject to the various loads is reached in a simple way. The motor cooler parts 15 are closed on the air side by the louvers 8 and the evaporators 7 are opened on the water side by the valve 9, i.e., the gas suspension bellows belonging to these pressure control systems require a pressure increase due to the respective difference in height between chassis and vehicle body. The cooler element 15a as well as the condenser 6a are opened on the air side by the louvers whilst the corresponding evaporator 7a is closed by the valve 9a, i.e. that the difference in height between chassis and vehicle body of the gas suspension bellows belonging to this pressure control system is too high and the vapor pressure is to be decreased. Thus the bellows associated with the evaporator 7 will be fed a gas having an increased pressure and will be subjected to an expanding force to raise the body of the vehicle. The bellows associated with the evaporator 7a will be fed a gas having a decreased or reduced pressure and will be subjected to a contracting force to effect a lowering of the body of the vehicle.

The gas used in this invention can be any one of many gases some of which are disclosed in U.S. Patent #2,999,680 issued to B. J. Eiseman, Jr., on September 12, 1961, and identified as Group 2 (column 8) and Group 3 (columns 8 and 9).

The invention hereinabove described may therefore, be varied in construction within the scope of the claims, for the particular device selected to illustrate the invention is but one of many possible embodiments of the same. The invention, therefore, is not to be restricted to the precise details of the structure shown and described.

What is claimed is:

1. A vehicle suspension system comprising a bellows, a controllably heated evaporator supplied with a liquid agent coupled in open connection with the gas suspension bellows through a variable heat transfer rate condenser.

2. Structure according to claim 1 wherein the condenser is cooled by air and the evaporator is heated by the motor cooling water.

3. Structure according to claim 2 wherein the capacity of the condenser is changed by changing the overall coefficient of heat transfer.

4. Structure according to claim 3 wherein the condenser is controllably blocked on the air side by louvers to effect a desired pressure.

5. Device according to claim 2 wherein the height between chassis and vehicle body activates both a valve to control the rate at which the motor cooling water is fed to the evaporator as well as an air control means to control air to cool the condenser.

6. Device according to the claim 5 distinguishing itself in such a way that the air control means and the valve are controlled, the former by the chassis through control rods fastened to same and the latter being also held by the chassis by means of a control cable or rod.

References Cited by the Examiner

UNITED STATES PATENTS

| 2,805,854 | 9/57 | Gaebler. | |
| 2,949,315 | 8/60 | Taylor | 280—124 |
| 2,999,680 | 9/61 | Eiseman | 267—65 |

FOREIGN PATENTS

| 1,057,830 | 5/59 | Germany. |
| 11,726 | 1894 | Great Britain. |

A. HARRY LEVY, *Primary Examiner.*

LEO FRIAGLIA, *Examiner.*